(12) United States Patent
Heijnen et al.

(10) Patent No.: US 11,174,724 B2
(45) Date of Patent: Nov. 16, 2021

(54) DOWNHOLE TOOL FOR DETECTING PIPE LEAKS

(71) Applicant: Total E&P Danmark A/S, Copenhagen O (DK)

(72) Inventors: Wilhelmus Hubertus Paulus Maria Heijnen, Stromberg (DE); Thomas Hahn-Jose, St. Ingbert (DE)

(73) Assignee: Total E&P Danmark A/S

( * ) Notice: Subject to any disclaimer, the term of this patent is extended or adjusted under 35 U.S.C. 154(b) by 174 days.

(21) Appl. No.: 16/061,010

(22) PCT Filed: Dec. 9, 2016

(86) PCT No.: PCT/EP2016/080486
§ 371 (c)(1),
(2) Date: Jun. 11, 2018

(87) PCT Pub. No.: WO2017/098000
PCT Pub. Date: Jun. 15, 2017

(65) Prior Publication Data
US 2018/0363451 A1    Dec. 20, 2018

(30) Foreign Application Priority Data
Dec. 11, 2015   (GB) .................................... 1521864

(51) Int. Cl.
*E21B 47/107* (2012.01)
*G01S 5/30* (2006.01)
(Continued)

(52) U.S. Cl.
CPC ............. *E21B 47/107* (2020.05); *G01S 5/30* (2013.01); *G01S 11/14* (2013.01); *G01S 15/89* (2013.01)

(58) Field of Classification Search
CPC ........... F21B 47/101; G01S 5/30; G01S 11/14
(Continued)

(56) References Cited

U.S. PATENT DOCUMENTS

| 4,265,126 A | 5/1981 | Papadofrangakis et al. |
| 4,905,203 A | 2/1990 | Sims et al. |

(Continued)

FOREIGN PATENT DOCUMENTS

EP       2587227 A1    5/2013

OTHER PUBLICATIONS

Suean Pascoe and Oriana Tolo, The Doppler Effect in Medical Ultrasound, URL:http://www.ultrasoundtraining.com.au/sb_cache/events/id/35/f, 14pgs.
(Continued)

*Primary Examiner* — Tarun Sinha
(74) *Attorney, Agent, or Firm* — Reising Ethington P.C.

(57) ABSTRACT

A downhole tool for investigating an outside fluid flow being adapted to operate in a well bore is presented. The downhole tool comprises a housing surrounded by an outside fluid and at least a first wave generator device. The first wave generator device preferably comprises a directional sound generator, for coupling waves into the surrounding outside fluid. The waves therein are scattered, for example, reflected, at inhomogeneities in the outside fluid, for example particles, scatterers and/or water in oil, thereby generating reflections. Said reflections are measured with a receiver device for receiving said reflections, and are evaluated using an evaluation device for determining first positions of said inhomogeneities in the outside fluid by evaluating said reflections, wherein the evaluation device is adapted to determine the outside fluid flow.

15 Claims, 9 Drawing Sheets

(51) Int. Cl.
*G01S 11/14* (2006.01)
*G01S 15/89* (2006.01)

(58) Field of Classification Search
USPC ...................................................... 73/40.5 A
See application file for complete search history.

(56) References Cited

U.S. PATENT DOCUMENTS

| | | | |
|---|---|---|---|
| 4,947,683 A | 8/1990 | Minear et al. | |
| 2014/0260589 A1* | 9/2014 | Hallundbæk et al. | G01N 27/221 73/152.32 |
| 2015/0034311 A1* | 2/2015 | Tunget | E21B 47/005 166/250.14 |

OTHER PUBLICATIONS

International Search Report, Int. Serial No. PCT/EP2016/080486, Int. Filing Date: Dec. 9, 2016, Applicant: Maersk Olie og Gas A/S, dated Mar. 22, 2017.
International Written Opinion, Int. Serial No. PCT/EP2016/080486, Int. Filing Date: Dec. 9, 2016, Applicant: Maersk Olie og Gas A/S, dated Mar. 22, 2017.
Communication from Intellectual Property Office, Combined Search and Examination Report under Sections 17 and 18(3), Application No. GB1521864.7, dated Jul. 12, 2016.
Combined Search and Examination Report under Sections 17 & 18(3), Application No. GB1521864 7, Applicant: Maersk Olie og Gas A/S, Date of Report: Jul. 12, 2016.
Search Report under Section 17, Application No. GB1521864.7, Date of Search: Jul. 11, 2016.

* cited by examiner

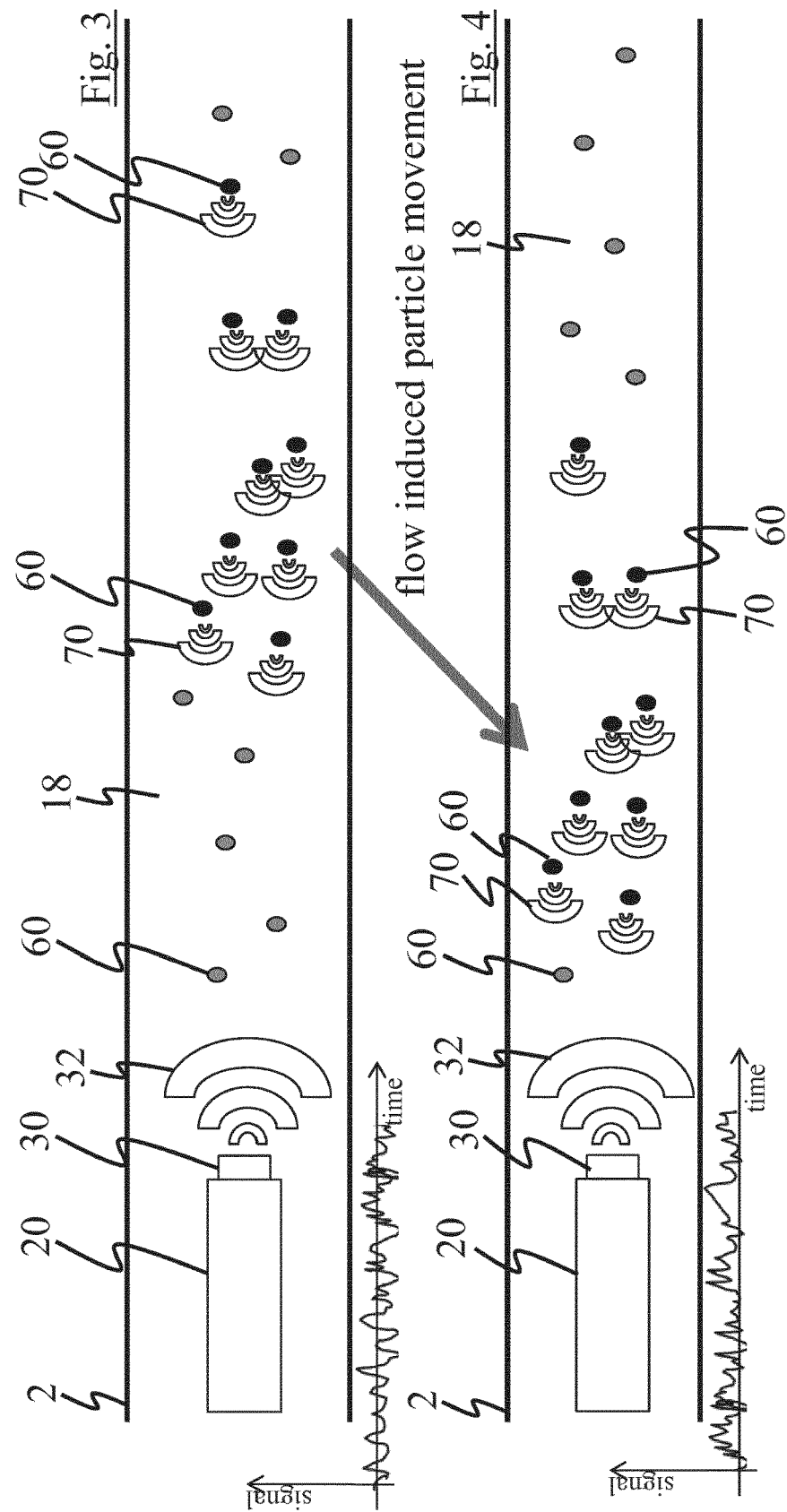

Experimental setup

Directions: A: side, B: bottom, C: top (to the leak)

Typical puls-echo signals of two consecutive measurements (blue: first signal, red: following signal), transducer frequency f=2MHz, burst length n=3, particle moving away from sensor with velocity v ≈ 25mm/s

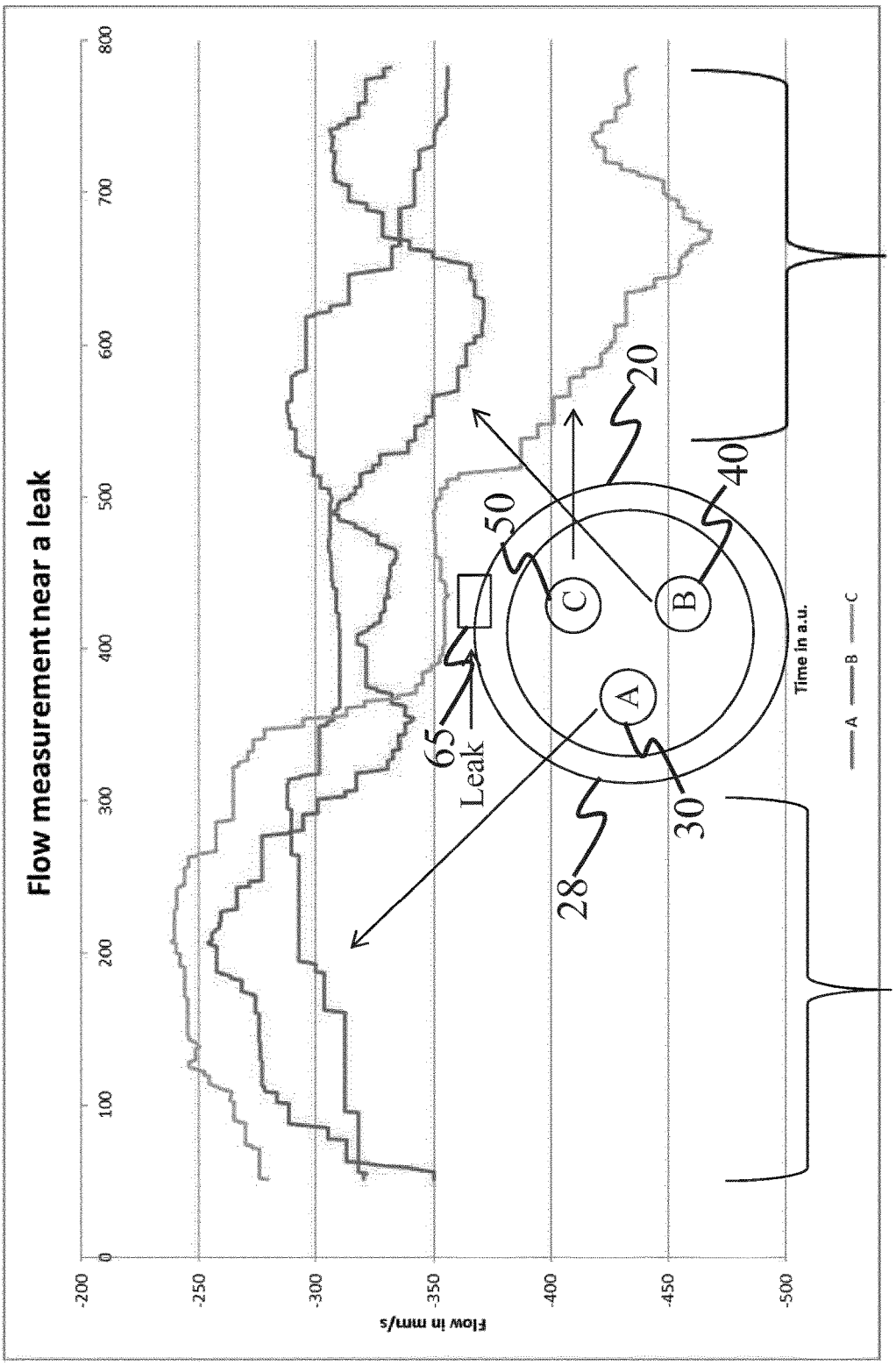

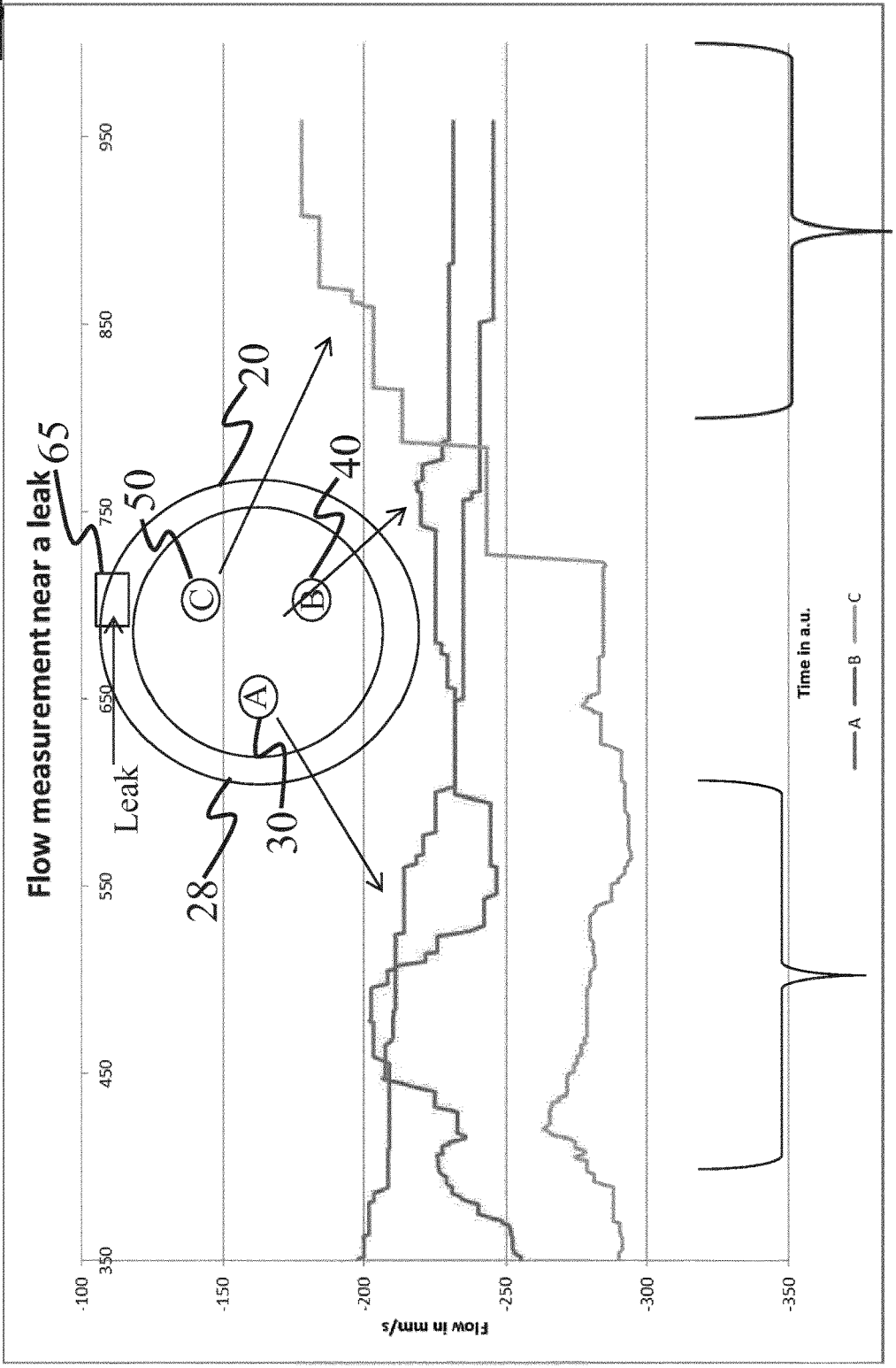

DOWNHOLE TOOL FOR DETECTING PIPE LEAKS

FIELD

The present disclosure is related to a downhole tool for leak detection especially in well bores.

BACKGROUND AND SUMMARY

Well bores are used in the petroleum and natural gas industry to produce hydrocarbons (production well) or to inject fluids, for example water, $CO_2$ and/or Nitrogen (injection well). Typically, such fluids are injected to stimulate, i.e. to enhance the hydrocarbon recovery. Lately, $CO_2$ injection has been introduced to this to reduce the $CO_2$-concentration in the atmosphere in order to defeat global warming.

Typically, a well bore is lined with a steel pipe or steel tubing, generally referred to as casing or liner, and cemented in the overburden section to reduce the risk of unwanted evacuation of fluids from the overburden and/or the reservoir into the surface environment. For completion of the reservoir section at present several options are typically used, namely open hole completion, or using a liner with several formation packers for sealing off sections of the annulus around the steel liner, or using a steel liner which is cemented in place and access to the reservoir is gained by perforating the liner and cement in a later stage of the completion, or completion of the well with a liner in open hole which has predrilled holes in the liner to gain access to the reservoir. It should be noted that the holes can also be made in a later stage of the well life.

During the production or injection of fluids from a well bore in an earth formation the well bore can enlarge due to chemical reactions and/or an instability of the borehole. This may occur due to injection or production pressure changes and/or erosion which can take place, for example, in case of production from unstable geological formations such as turbidities known for their unpredictable sand face failure resulting in massive sand production leading to well failure. Furthermore, when injection processes are being used fractures can be generated resulting in undesired direct communication between the injection and production wells. On the other hand the well can collapse, for example caused by compaction, a process which happens when the pressure in the reservoir reduces, or by the use of chemicals used to improve injectivity or productivity. The latter can cause a collapse of the annulus and therewith possibly block the access to the reservoir and, therewith, preventing injection or production. Also there may be a phenomenon which is called cross flow in the annulus. Cross flow in the annulus is the result of pressure differences along the liner of the production or injection well in an un-cemented completion. The latter can lead to loss of production and/or loss of economic reserves.

The well bore and/or the casing or liner and/or the reservoir section may, for example, be subject to inspection, for example, in order to verify physical properties such as pressure or temperature, more general to collect information about the status, or in order to observe defects or anomalies, in particular in order to prevent collapses of all kind of the well.

As the total length from the reservoir to an access at the top end of the well bore may sum up to several hundred or even several thousand meters retrieving such data, for example, to an extraction facility at said access, is difficult and subject to continued development.

It is particularly desirable to deliver the data related to the afore-mentioned phenomena, which is, however, difficult because of the environmental conditions, for example, within a steel pipe or steel tubing extending between the reservoir and the access.

Of particular interest are abnormalities in the surrounding surface of the well bore, for example, the surface of the casing/liner or, if no casing/liner is in place, the surface of the surrounding earth material, which is the drill channel, where the well bore is drilled through. Such abnormalities can, for example, be a crack or any kind of opening to the surrounding earth material, where well bore fluid may escape from or stream into the well bore.

Therefore it is an object of the present disclosure to provide a downhole tool with which abnormalities in or on the drill channel or in or on the casing/liner.

Yet another aspect of the object of the present disclosure is to improve the limitations mentioned above.

The object of the present disclosure is achieved by subject matter of the independent claims. Preferred embodiments of the present disclosure are subject of the dependent claims.

The downhole tool which achieves the object of the present disclosure and which is presented here comprises a specialized detection system which is capable of measuring crossflows or inhomogeneities in the stream of well bore fluid in the well bore. By detecting crossflows or inhomogeneities in the stream of well bore fluid conclusions may be made about the origin of such crossflow or inhomogeneities, therewith realizing a detection or localization system of a crack or opening in the drill channel and/or casing/liner.

The downhole tool being adapted to investigate an outside fluid flow and which further is adapted to operate in a well bore, comprises a housing which is surrounded by an outside fluid. The outside fluid typically is the well bore fluid.

The downhole tool further comprises at least a first wave generator device for coupling waves into the surrounding outside fluid. The first wave generator device is, by way of example, arranged at a front side of the housing. The arrangement of the first wave generator device influences the measurement sensitivity with respect to the measurable flow direction. When arranged at the front side of the downhole too, especially when a directional sound generator is comprised with the first wave generator device, a measurement of fluid flow of the outside fluid in a translational direction is eased. In other words, the measurement of the longitudinal fluid flow along the well bores extension direction is eased. In another example, when the first wave generator device is positioned at a side of the downhole tool which is facing towards the sidewall of the well bore or the casing/liner, it is possible, that, for example, measurement of a crossflow in the outside fluid is eased.

The waves coupled into the outside fluid, for example, by the first wave generator device, can comprise a single wave motion, for example, a ping-like short-term signal. The waves coupled into the outside fluid can also be composed of a sinusoidal signal, for example, a tone which may have a certain pitch and/or loudness, for example, in the region of ultrasound signals. Ultrasound signals are preferred due to their comparatively long range in fluid.

The waves generated by the first wave generator device are scattered, for example, reflected, at inhomogeneities in the outside fluid. Such inhomogeneities can be for example particles, scatterers and/or water in oil. In general, inhomogeneities are present in a vast number throughout the outside fluid, so that enough inhomogeneities are present in the measurement range of the downhole tool.

When the inhomogeneities are hit by said waves and such waves are scattered at the inhomogeneities, reflections are generated thereby.

A receiver device is installed at the downhole tool for receiving said reflections. In other words, reflections which are thrown back on the downhole tool can be detected by the receiver device. The receiver device therefore may comprise a membrane which is excited by the reflections. It is possible, that the first wave generator device and the receiver device is one same device.

The downhole tool further comprises an evaluation device for determining first positions of said inhomogeneities in the outside fluid by evaluating said reflections, wherein the evaluation device is adapted to determine the outside fluid flow.

The evaluation device may for example comprise a trigger for capturing the event in time of coupling said waves into said outside fluid. In other words, releasing said waves into said outside fluid releases said trigger, which trigger runs until a second event occurs. The second event can then be the detection of the reflection by the receiver device. For example, the evaluation device is connected to the receiver device and reads out the signal received by the receiver device.

The evaluation device determines the first positions of said inhomogeneities by measuring an elapsed time between coupling said waves into the surrounding outside fluid using said wave generator device and receiving said reflections using said receiver device. For example, by analysing the trigger runtime from the trigger start when coupling said waves into the surrounding outside fluid until receiving said signal from the receiver device, a distance to said inhomogeneity is detectable.

The evaluation device further determines second positions of said inhomogeneities by again measuring an elapsed time between coupling second waves into the surrounding outside fluid and receiving second reflections. By comparing the first positions with the second positions a movement of the inhomogeneities may be tracked or noticed.

The evaluation device further may be able to evaluate position changes of said inhomogeneities, preferably to evaluate a position and/or velocity pattern of the inhomogeneities, by comparing said first positions with said second positions. In other words, the evaluation device gathers data from the wave generator device(s), for example, the sending time of the coupling wave, and it gathers further data from the receiver device, for example, the time of receiving reflections. The evaluation device, for example, then calculates first and second positions, for example, distances in relation to the downhole tool, from said inhomogeneities, and thus is able to, for example, calculate velocity and/or mass flow rates of fluid flows in the well bore. For instance, the evaluation device thus also takes into account the velocity of the downhole tool itself moving in the well bore, and/or it takes into account a known longitudinal fluid velocity of the outside fluid flowing along the well bore extension direction to thus obtain resulting transverse velocity components of movement, which is, for example, cross flows. Generally speaking, a cross flow can be any transverse movement of the fluid flow perpendicular to the longitudinal fluid flow which flows along the extension direction of the well bore.

The downhole tool may thus comprise calculation of an outside fluid flow velocity and/or a crossflow in the outside fluid and/or a fluid amount (mass flow rate) entering the well bore or escaping out of the well bore through an undesired opening or crack in the well bore.

The evaluation device may be designed to detect a variation of the position and/or velocity pattern of the inhomogeneities in the outside fluid, thereby identifying translationally movement of the outside fluid and/or alterations of the structure of the well bore and/or a direction depending fluid flow.

The correlation coefficient between the first position(s) and the second position(s) is determined, which is expressed, by way of example, by the cross autocorrelation function.

In preferred embodiment of the present disclosure the first wave generator device comprises a directional sound generator. The directional sound generator generates sound waves with a predefined emission direction, or an emission cone which has a limited range of emission direction, so that additional direction information is obtainable when evaluating said reflections.

The downhole tool may also comprise a second wave generator device having a directional sound generator. The second wave generator device is oriented such that it emits its waves with a beam angle with respect to the waves of the first wave generator device.

The receiver device may then be also adapted to receive reflections from waves from the second wave generator device. However, it is also applicable that the second wave generator device is adapted to also receive waves coupled into the outside fluid, so that the second wave generator device can receive the waves it released. In other words, the second wave generator device can be a combined wave generator and receiver device.

The evaluation device then is adapted to also evaluate a second velocity and position pattern derived from the second positions and/or a difference between the first and the second positions.

The downhole tool can further comprise a third wave generator device having a directional sound generator for coupling waves into the outside fluid, the third wave generator device comprising a predefined beam angle with respect to the first wave generator device and also a predefined beam angle to the second wave generator device.

The beam direction of the wave generator device and/or of the second wave generator device and/or of the third wave generator device can be designed to be adjustable thereby allowing to adjust the beam angle in between the wave generator devices. Thus it is possible to optimize the obtainable measurement accuracy as in dependency upon the beam angle. The measurement accuracy can be high at close distances or high with inhomogeneities farther away from the downhole tool.

The wave generator devices may be arranged in a common plane, for example, at one side of the downhole tool.

In another preferred embodiment the wave generator devices are arranged such that one specific inhomogeneity, for example, a specific particle in the outside fluid, is "scanned" (or detected) with more than one wave generator device, so that at least two different sets of information, for example, each regarding distance and velocity of said inhomogeneity, are available for further processing.

The directional sound generator may be composed by a transducer. Such a transducer may comprise a membrane being in contact with an outer side with the outside fluid and having mounted at an inner side of the membrane, for example, an electromechanic membrane driver.

The downhole tool is designed for being deployed in a production well and/or for being deployed in an injection well.

The wave generator device and/or the second wave generator device and/or the further wave generator device may be designed to couple ultrasonic sound waves into the outside fluid.

The downhole tool being adapted to operate in the well bore fluid in a well bore may further comprise an elongated housing which is adapted for operation in an elongated well bore.

The downhole tool may be part of a multifunctional downhole tool which, for example, collects data in the well bore and/or the reservoir or which operates other functions particularly for sustaining the well bore, for example, does cementations of an outer wall of the well bore or the like. The downhole tool can also comprise the functionality of a communication equipment in order to exchange data, for example, with a central station in the extraction facility.

The present disclosure is described in more detail and in view of preferred embodiments hereinafter. Reference is made to the attached drawings wherein like numerals have been applied to like or similar components.

BRIEF DESCRIPTION OF THE FIGURES

It is shown in

FIG. 3 a cross-sectional schematic of a downhole tool in a well bore with particles in the outside fluid;

FIG. 4 another cross-sectional schematic of a downhole tool with particles having moved in comparison to FIG. 3;

FIG. 10 example of a measurement result using an evaluation unit;

FIG. 11 another example of a measurement result using an evaluation unit.

DETAILED DESCRIPTION

Figure 1:
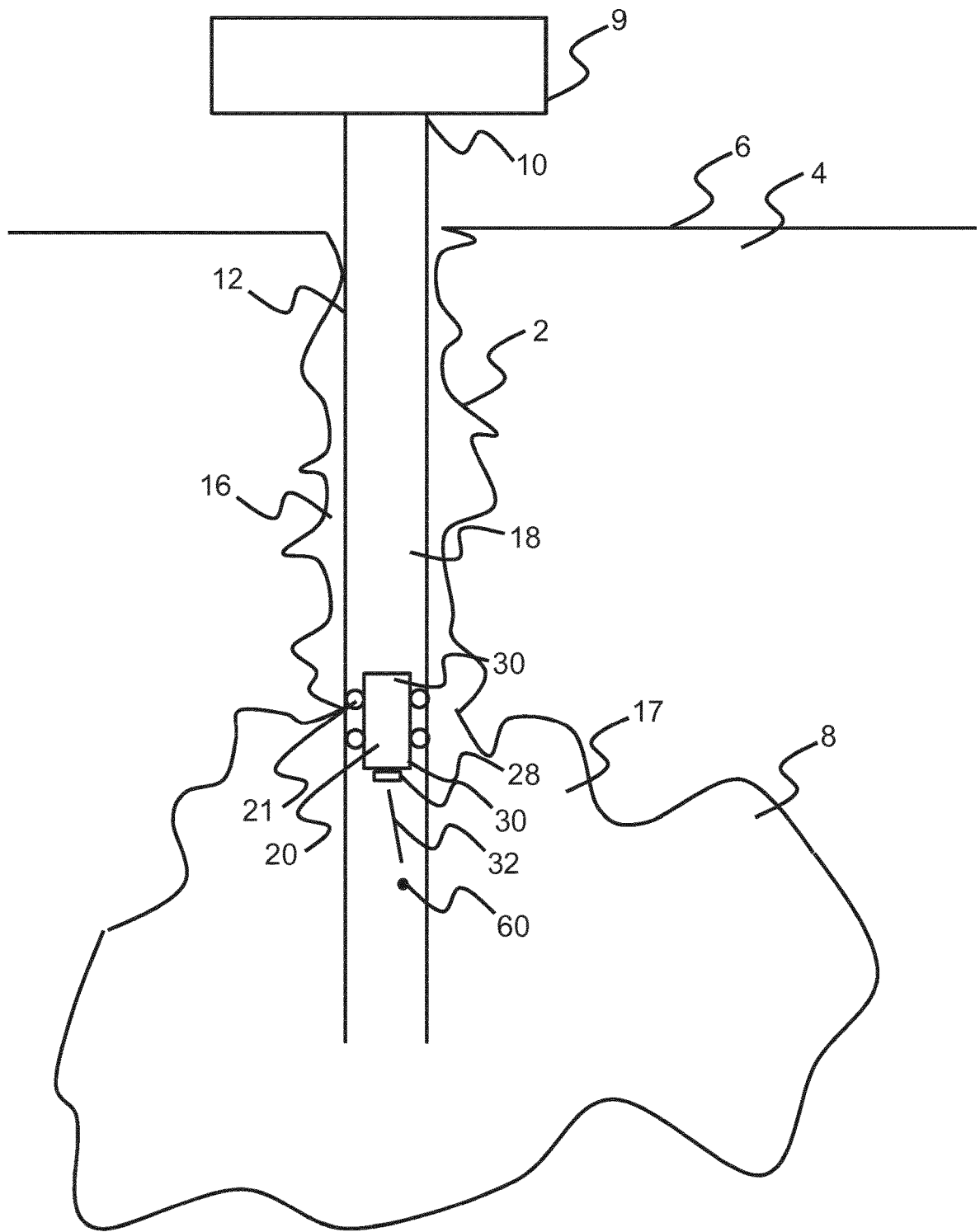
FIG. 1 a schematic cross-sectional view of an earth formation with a downhole tool in a well bore.

In FIG. 1 a well bore 2 is drilled in an earth formation 4 to exploit natural resources like oil or gas. The well bore 2 continuously extends from the extraction facility 9 at or near the surface 6 to a reservoir 8 of the well bore 2 situated distal from the wellhead 10 at the extraction facility 9.

A casing/liner 12 in the form of an elongated steel pipe or steel tubing is located within the well bore 2 and extending from the wellhead 10 to an underground section of the well bore 2. The reservoir 8 and/or the casing/liner 12 are typically filled with a fluid 16, 17, 18, respectively. The fluids 16, 17, 18 are, for example, oil or gas in case of a production well or water, $CO_2$ or nitrogen in case of an injection well.

A downhole tool 20 is located within the casing or liner 12. The downhole tool 20 operates autonomously having internal power storage 92 (see for example, FIG. 2) and thus needs not be powered or wired externally. To sum up, the downhole tool 20 can be operated quite freely in the well bore 2 and particularly needs not to be cable linked to the surface.

The downhole tool 20 may additionally be a movable downhole tool 20 being moved by moving means 21, generally known to the skilled person, within the casing or liner 12 to any desired position in the casing or liner 12 or even in the reservoir 8.

The downhole tool 20 is equipped with a first wave generator device 30 which couples a wave 32 into the outside fluid to detect and/or track a particle 60 in the outside fluid.

Figure 2:
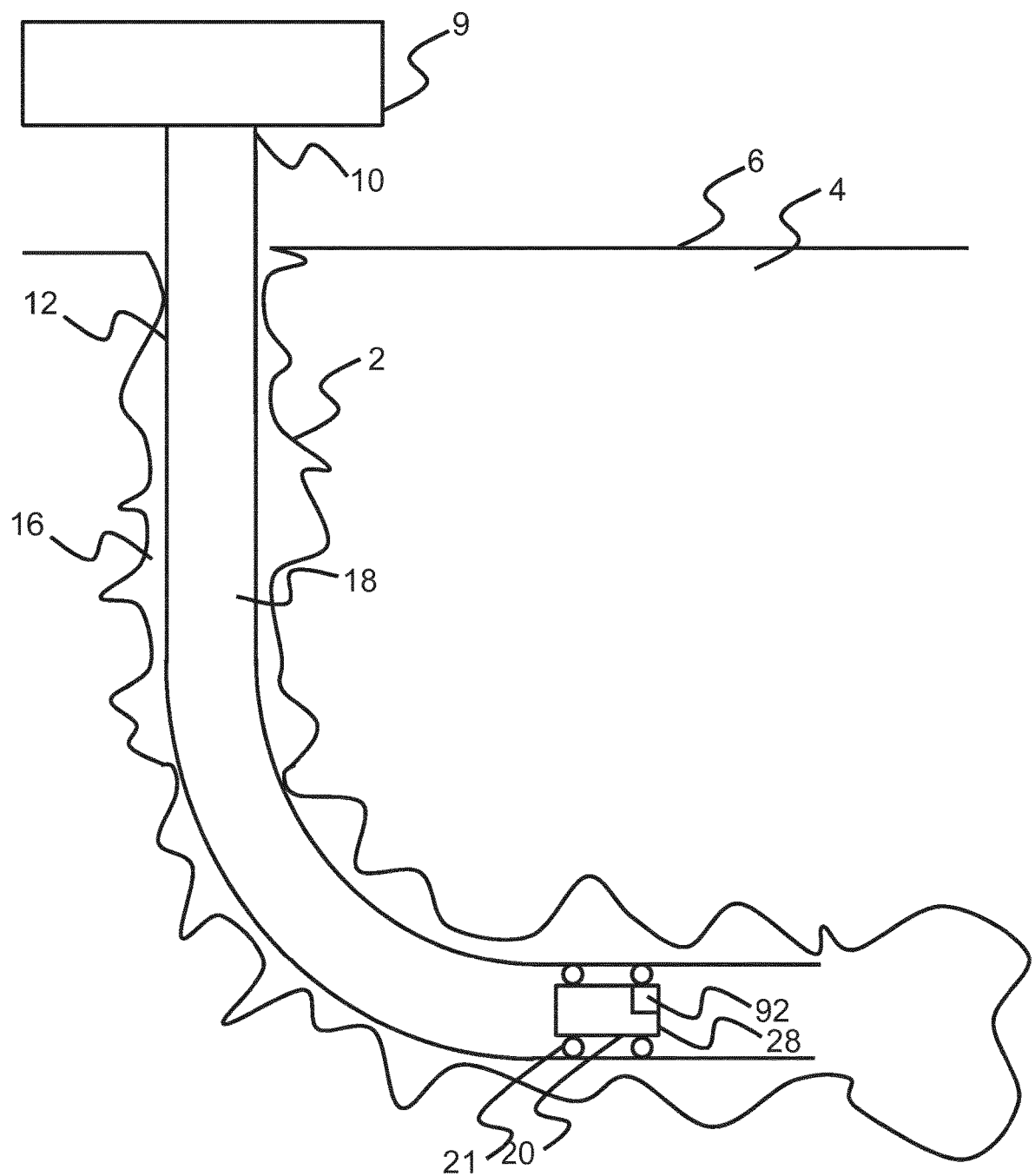
FIG. 2 another schematic cross-sectional view of an earth formation with a downhole tool in a well bore having a horizontal section partly covered by a liner.

FIG. 2 shows another earth formation with a downhole tool 20 positioned in a horizontal portion of the casing/liner 12. The liner 12 in this embodiment only partly covers the well bore. The downhole tool 20 comprises a power supply 92.

FIG. 3 depicts a side view of a downhole tool 20 in a well bore 2, the downhole tool 20 having a first wave generator device 30 at a side of the downhole tool 20. The first wave generator device couples waves 32 into the outside fluid 18. While propagating through the outside fluid 18 the waves 32 can hit inhomogeneities 60, such as particles of any kind which are worn by the outside fluid 18. In other words, the particles 60 are used as markers indicating the movement of the outside fluid 18, for example, the velocity in the case of one-dimensional analysis, which happens to be an easy way of measurement when one wave generator device 30 is used.

The waves 32, for example, ultrasound waves 32, are reflected or more generally scattered, at said inhomogeneities 60 thereby generating new waves at said inhomogeneities 60. These new waves are referred to as reflections 70.

As can be seen in FIG. 3 at several inhomogeneities 60 reflections 70 are indicated. These particles 60 together form a group of particles 72 or a pattern 72. The downhole tool 20 is capable of observing whether the pattern 72 keeps its structure or whether the inhomogeneities 60 show a movement in relation to each other, thereby altering the pattern 72.

FIG. 4 indicates at most the same system as described with respect to FIG. 3, but the inhomogeneities 60 have moved in the longitudinal fluid flow. So to say, the inhomogeneities 60 have moved towards the downhole tool 20. However, as the downhole tool 20 also detects the pattern 72, it is capable of observing, that, in this case, no intra-pattern-movement is present, as the pattern 72 is unamended and only translationally moved with respect to the downhole tool 20 and/or with respect to the well bore 2. In other words, the downhole tool 20 is able to measure the flow of the outside fluid 18 with a single transducer, which is the first wave generator device 30, by monitoring the particle induced reflections.

Figure 5:
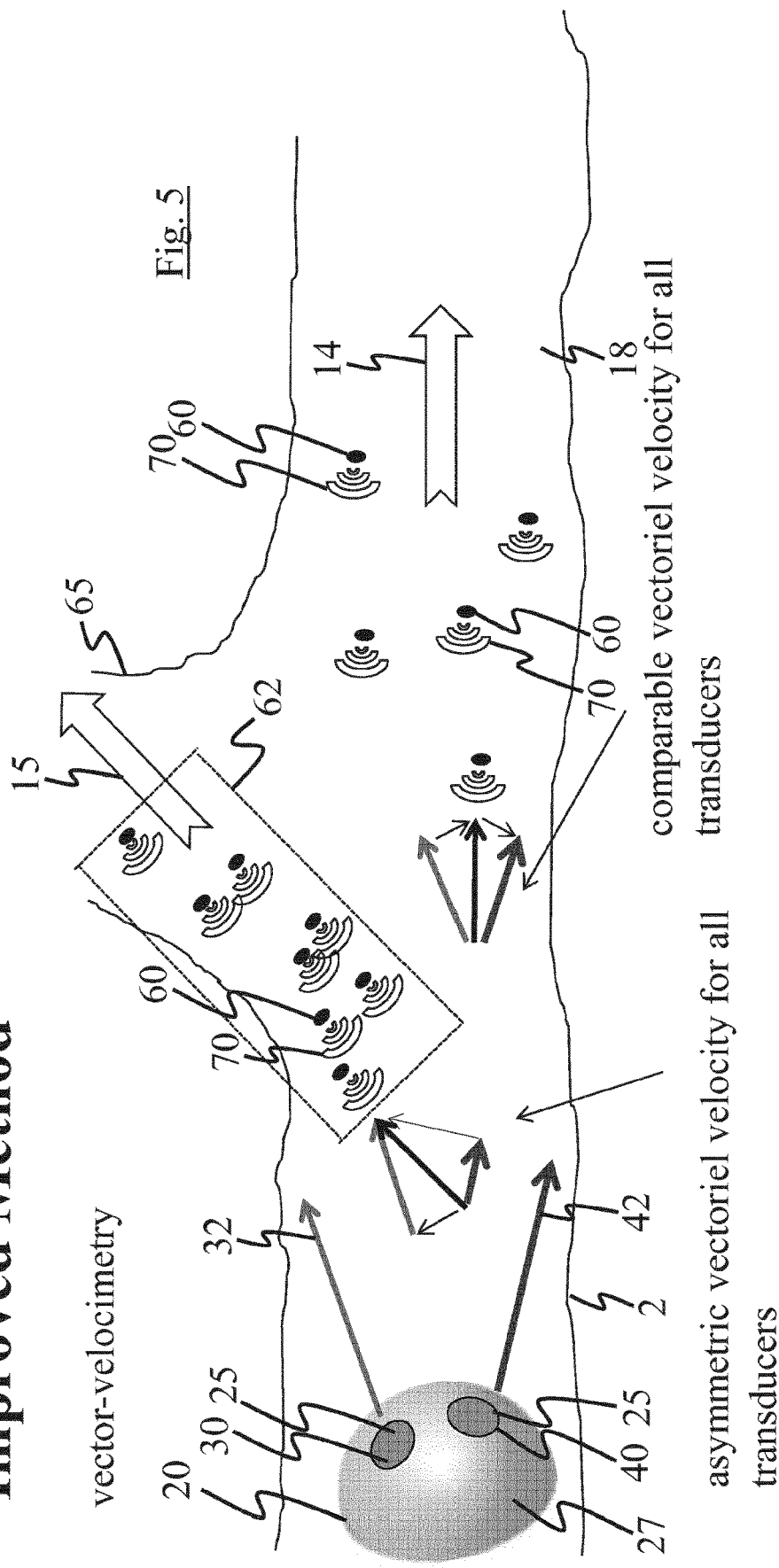
FIG. 5 a downhole tool in a well bore having a leak.

FIG. 5 shows another embodiment of the downhole tool 20 deployed in a well bore 2 having a leakage 65. A longitudinal fluid flow direction 14 is indicated depicting the "main flow" in the well bore 2, or in other words, the "wanted flow". Another fluid flow direction 15 at the leakage 65 indicates a fluid flow not pointing towards the same direction as the longitudinal fluid flow direction 14. In other words, the other fluid flow direction 15 shows a transverse component of translation with respect to the longitudinal fluid flow direction 14. As the case may be, the other fluid flow direction 15 to the leakage 65 may be a cross flow 15.

The downhole tool 20 in the embodiment of FIG. 5 comprises two wave generators 30, 40, where the first wave generator 30 couples waves 32 into the outside fluid 18 and the second wave generator 40 couples waves 42 into the outside fluid 18. The waves 32, 43 can have identical properties, but it is preferred to, for example, allow identification of specific wave by using a different tune or pulse width or the like.

The waves 32, 42 hit inhomogeneities 60, wherein reflections 70 are generated. The downhole tool can detect these reflections 70 with a receiver device 25. In this embodiment, the first and the second wave generator devices 30, 40 are designed such that they are able to both couple waves into the outside fluid 18 and also detect waves, such as reflections 70, from the outside fluid 18. In other words, each wave generator device 30, 40 is a combined wave generator and detection device 25, 30, 40.

As is shown in FIG. 5, by obtaining reflection information data from the first and the second wave generator device 30, 40 the downhole tool 20 is capable of determining vectoral velocity components for each of the inhomogeneities 60.

The downhole tool 20 of FIG. 5 further comprises an evaluation device 27 for evaluating, for example, fluid flow velocity components. The evaluation device 27 further can determine the particle pattern 62.

Figure 6:
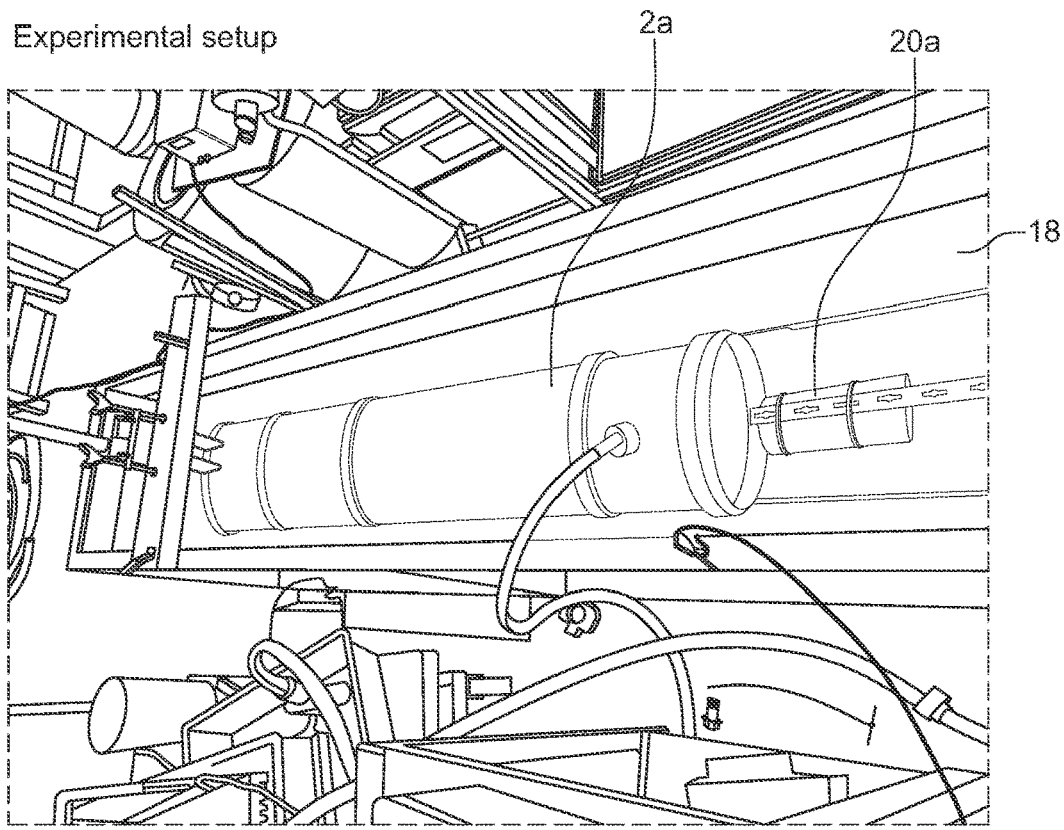
FIG. 6 an experimental setup of an experimental downhole tool.

FIG. 6 shows an experimental setup of an experimental downhole tool 20a in an experimental well bore 2a for determination of downhole tool properties. An outside fluid 18 is filled in the experimental well bore 2a, the outside fluid 18 comprising inhomogeneities 60 to be detected by the downhole tool 20a.

Figure 7:
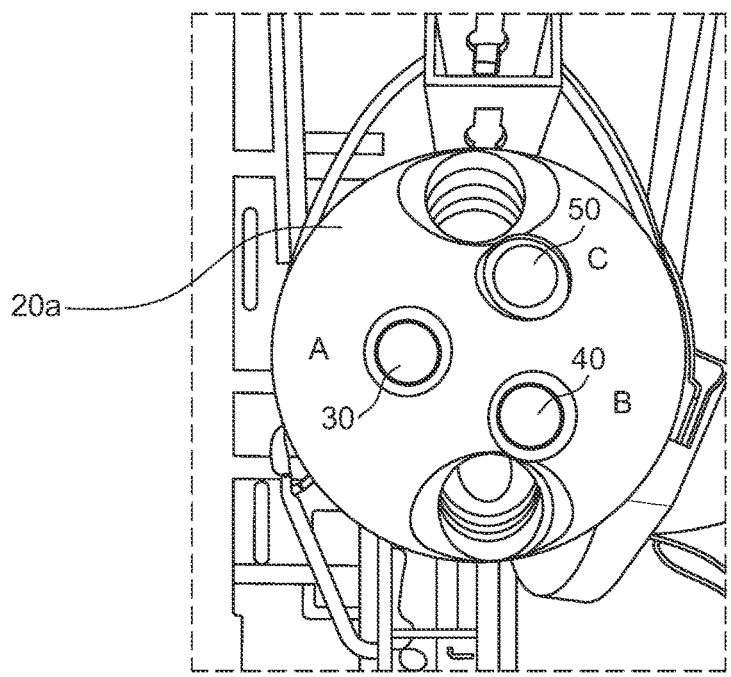
FIG. 7 detail view of the experimental downhole tool.

FIG. 7 shows a close look of the front side of the downhole tool 20a showing three wave generator devices 30, 40, 50.

Figure 8:
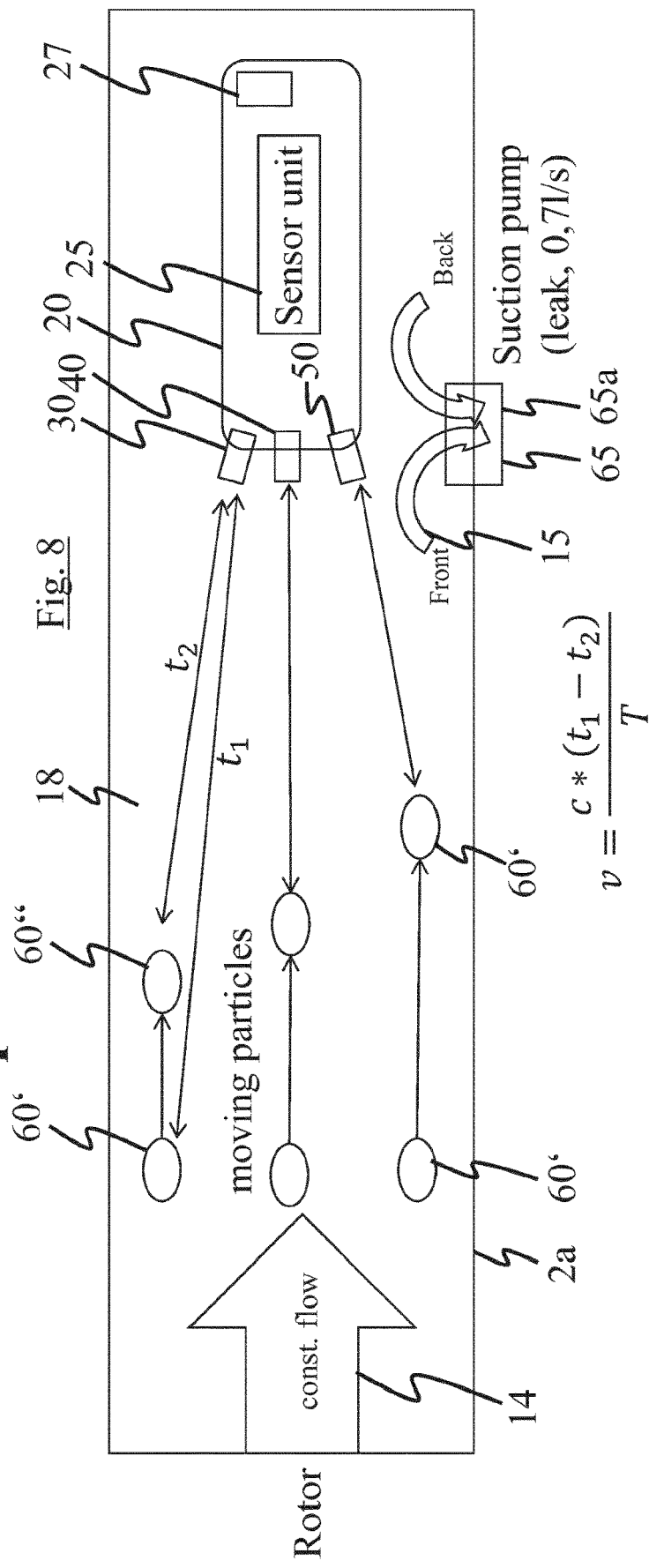
FIG. 8 a schematic of a downhole tool in a liner.

FIG. 8 shows a schematic setup of the measurement principle. The downhole tool 20 comprises the first, the second and a third wave generator device 30, 40, 50. Each wave generator device 30, 40, 50 couples waves into the outside fluid 18. Inhomogeneities 60, or particles 60, are present in the outside fluid 18. The particles 60 comprise a particle velocity, whereas the particle velocity can be divided into directional velocity components, such as the velocity v of the particle in the direction of the sensor. $t_i$ indicates the echo delay, which is the time between coupling the wave into the outside fluid 18 and receiving the reflection 70 at the downhole tool 20. For example, for one specific particle moving in time from position 60' to position 60", for example, coming closer to the downhole tool 20 as shown in FIG. 8, a first echo delay indicated by $t_1$ is measured at a first point in time, whereas a second echo delay indicated by $t_2$ is measured at a second point in time which is after the first point in time. The velocity of the particle in the direction of the first wave generator device 30 is then given by the formula $$v = \frac{c*(t_1 - t_2)}{T}$$

wherein c is the velocity of ultrasound in water, when ultrasound is used as the wave shape, and T is the time between two measurements, which is, for example, the time between the coupling of the first wave 32 and the coupling of the second wave 32' into the outside fluid 18.

For modelling crossflow in the experimental well bore 2a of FIG. 8 a suction pump 65a is installed as a leakage 65. A crossflow 15 thereby is generated inside the (experimental) well bore 2a. The experimental cross flow generates a leakage of 700 ml/s. A rotor generates a constant longitudinal fluid flow direction 14, which is comparable to the longitudinal fluid flow 14 in a well bore 2.

Figure 9:
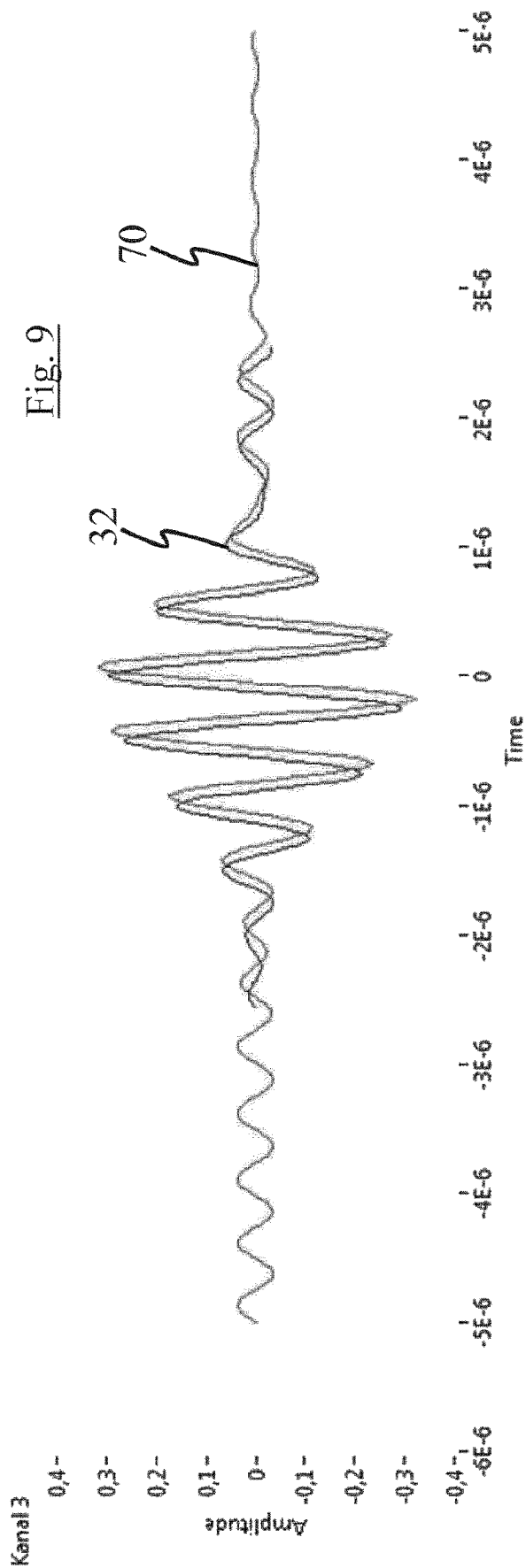
FIG. 9 example of a signal result.

FIG. 9 shows the overlay of a typical wave 32 and its corresponding reflection 70. Shown are typical pulse echo signals of two consecutive measurements with a transducer frequency of f=2 MHz, a burst length n=3 and a particle moving away from the receiver device 25 with a velocity v of about 25 mm/s.

FIG. 10 shows the result of evaluating with the evaluation device 27 fluid flow velocity components of the outside fluid with a first, a second and a third wave generator device 30, 40, 50. The downhole tool 20a is moved along the well bore 2a passing a leakage 65.

FIG. 11 shows another result of evaluating with the evaluation device 27 fluid flow velocity components of the outside fluid when passing a leakage 65 with the downhole tool 20a.

To summarize, a downhole tool 20 which is capable of identifying disturbances, leakages 65 or other losses of fluid flow in a well bore 2 is presented. The downhole tool 20 uses a direction dependent flow measurement system and implements speckle tracking. By way of example, in a well bore having an oil production of 10.000 barrel per day a typical longitudinal fluid flow of about 18 l/s is reached corresponding to a fluid position change of 400 mm/s. It is desired to keep this fluid flow as constant as possible, for example, detecting fluid flow deviations bigger than 5%, which is bigger than 0.9 l/s. Such fluid flow measurement using speckle tracking is successfully demonstrated with the experimental setup. A direction dependent flow measurement is possible. Thus, a detection of a leakage 65 in a well bore 2 is possible with the presented downhole tool 20.

It will be appreciated that the features defined herein in accordance with any aspect of the present disclosure or in relation to any specific embodiment of the present disclosure may be utilized, either alone or in combination with any other feature or aspect of the present disclosure or embodiment. In particular, the present disclosure is intended to cover a downhole tool configured to include any feature described herein. It will be generally appreciated that any feature disclosed herein may be an feature of the present disclosure alone, even if disclosed in combination with other features, irrespective of whether disclosed in the description, the claims and/or the drawings.

It will be further appreciated that the above-described embodiments of the present disclosure have been set forth solely by way of example and illustration of the principles thereof and that further modifications and alterations may be made therein without thereby departing from the scope of the present disclosure.

What is claimed:

1. Downhole tool for a pipe leak in a well bore, comprising:
   a housing surrounded by an outside fluid,
   a first wave generator device comprising a first directional sound generator for coupling waves into the surrounding outside fluid at a first beam angle,
   a second wave generator device having a second directional sound generator for coupling waves into the surrounding outside fluid at a second beam angle different from the first beam angle of the first wave generator device,
   a third wave generator device having a third directional sound generator for coupling waves into the surrounding outside fluid at a third beam angle different from the second beam angle of the second wave generator device,
   wherein the first, second, and third wave generator devices are arranged at a front side of the downhole tool, and wherein the waves from the first, second, and third wave generator devices are scattered at inhomogeneities in the outside fluid, thereby generating reflections, to calculate a fluid amount entering the well bore or escaping out of the well bore through said pipe leak, and wherein the waves generated by the first, second, and third wave generator devices are different, with different properties to allow identification of the different waves, and wherein the first, second, and third wave generator devices are arranged such that a particular inhomogeneity is detected with more than one of the wave generator devices to produce at least two different sets of data for the particular inhomogeneity, a receiver device for receiving said reflections, and an evaluation device for determining first positions of said inhomogeneities in the outside fluid by evaluating said reflections, wherein the evaluation device is adapted to determine the outside fluid flow.

2. Downhole tool according to claim 1, wherein the evaluation device comprises a trigger for capturing an event in time of coupling said waves into said outside fluid.

3. Downhole tool according to claim 2, wherein the evaluation device determines the first positions of said inhomogeneities by measuring an elapsed time between coupling said waves into the surrounding outside fluid using said wave generator device and receiving said reflections using said receiver device.

4. Downhole tool according to claim 3, wherein the evaluation device further determines second positions of said inhomogeneities-by again measuring an elapsed time between coupling second waves into the surrounding outside fluid and receiving second reflections, wherein the evaluation device further evaluates position changes of said inhomogeneities, by comparing said first positions with said second positions.

5. Downhole tool according to claim 1, wherein the evaluation device is designed to detect a variation of the position and/or velocity pattern thereby identifying translational movement of the outside fluid and/or alterations of the structure of the well bore and/or a direction depending fluid flow.

6. Downhole tool according to claim 5, wherein a correlation coefficient between the first position and the second position is determined.

7. Downhole tool according to claim 6, wherein the receiver device is also adapted to receive reflections from waves from the second wave generator device wherein the evaluation device is adapted to also evaluate a second velocity and position pattern derived from the second positions and/or a difference between the first and the second positions.

8. Downhole tool according to claim 1, wherein the beam direction of the wave generator device and/or of the second wave generator device and/or of the third wave generator device is adjustable thereby allowing to adjust the beam angle in between the wave generator devices.

9. Downhole tool according to claim 1, wherein the first directional sound generator is a transducer.

10. Downhole tool according to claim 9, wherein the downhole tool is suitable for being deployed in a production well or is suitable for being deployed in an injection well.

11. Downhole tool according to claim 10, wherein the wave generator device and/or the second wave generator device and/or the third wave generator device is/are designed to couple ultrasonic sound waves into the outside fluid.

12. Downhole tool according to claim 1, wherein the evaluation device is connected to the receiver device in the downhole tool to gather data therefrom in order to calculate in the well bore at least one of a velocity or a mass flow rate of fluid flow.

13. Downhole tool according to claim 1, wherein the first and second wave generator devices are radially spaced from a central longitudinal axis of the downhole tool.

14. Downhole tool according to claim 1, further comprising an internal power storage configured to power the downhole tool so that the downhole tool operates autonomously.

15. Downhole tool according to claim 1, wherein said pipe leak is a side flow leak via an undesired opening or crack in the well bore.

* * * * *